July 29, 1930.  C. G. CLEMENT  1,771,572
TRAILER CONSTRUCTION
Filed Jan. 23, 1928   2 Sheets-Sheet 1
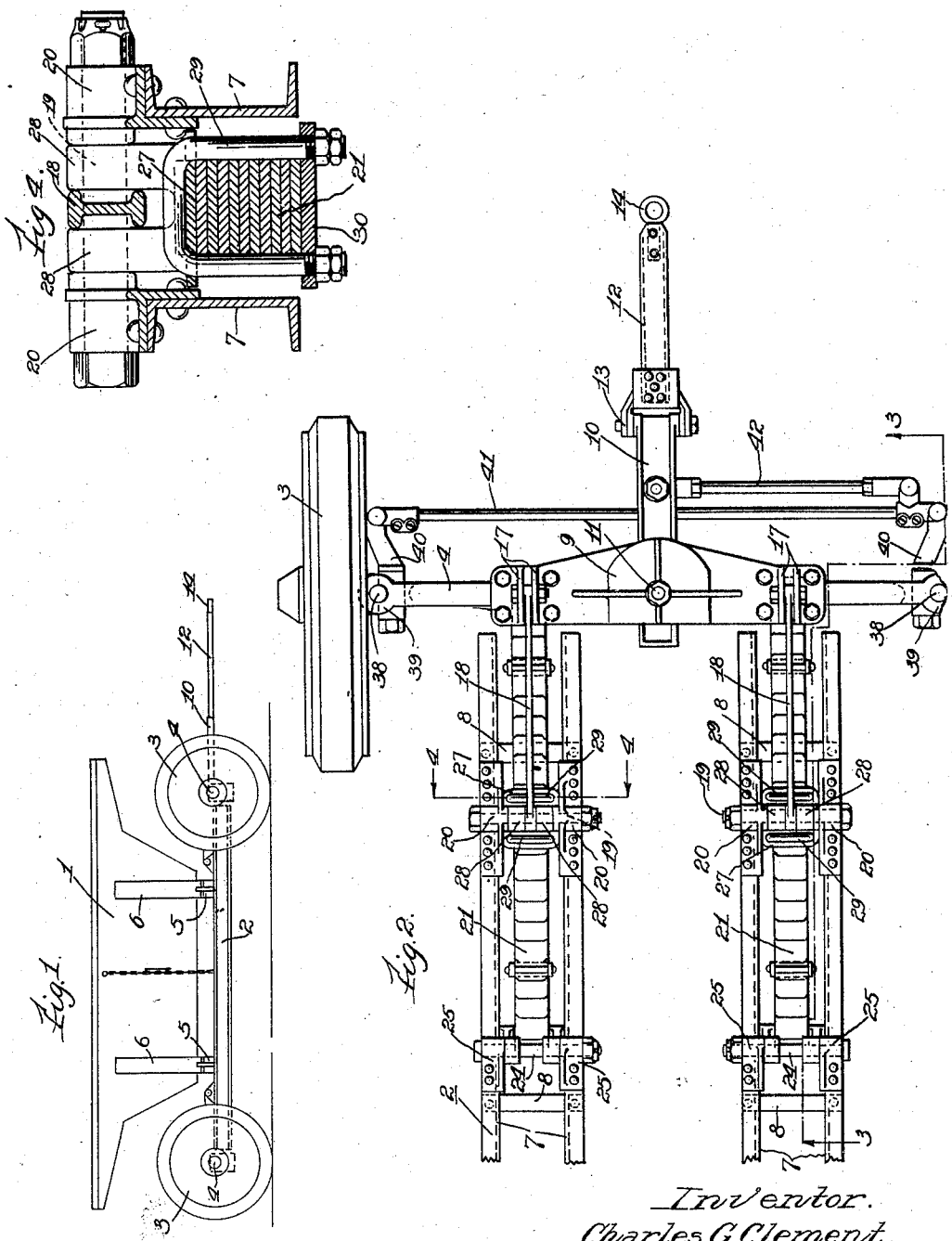
Inventor.
Charles G. Clement.
by his Attorneys.

July 29, 1930.  C. G. CLEMENT  1,771,572
TRAILER CONSTRUCTION
Filed Jan. 23, 1928   2 Sheets-Sheet 2
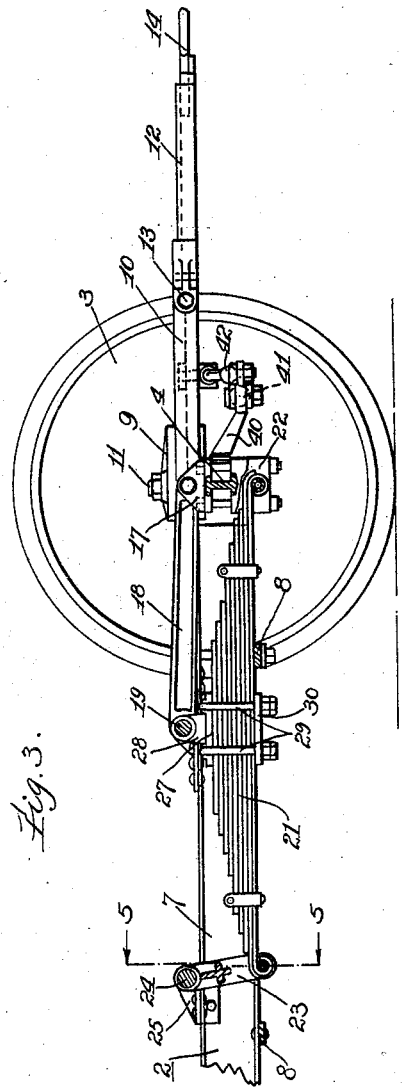
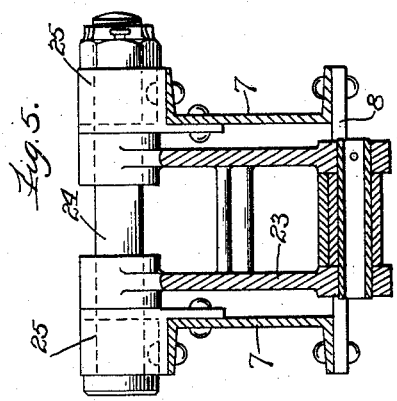
Inventor.
Charles G. Clement.

Patented July 29, 1930

1,771,572

UNITED STATES PATENT OFFICE

CHARLES G. CLEMENT, OF EDGERTON, WISCONSIN, ASSIGNOR TO HIGHWAY TRAILER COMPANY, OF EDGERTON, WISCONSIN, A CORPORATION OF WISCONSIN

TRAILER CONSTRUCTION

Application filed January 23, 1928. Serial No. 248,693.

This invention relates to vehicles of the trailer type, and has for an object to provide an improved spring mounting for suspending the frame in substantially the same plane as the axles, whereby the pull exerted on the draw bar may be transmitted through the frame in an approximately straight line. It consists in the various features and elements of construction and combination of parts hereinafter described and as shown in the drawings and as indicated by the claims.

In the drawings:

Figure 1 is a somewhat diagrammatic view in side elevation of a vehicle embodying the present invention, provided with a laterally tiltable type dumping body.

Figure 2 is a fragmentary plan view of the front end of the vehicle with the body removed.

Figure 3 is a vertical longitudinal section illustrating the improved frame suspension, taken as indicated at line 3—3 on Figure 2.

Figure 4 is a vertical section through the frame and spring as indicated at line 4—4 at Figure 2.

Figure 5 is a transverse section to a frame member, taken at line 5—5 on Figure 3.

This invention is a continuation in part of my co-pending application, Serial Number 218,450, filed September 9, 1927.

As shown in the drawings my invention is illustrated in connection with a vehicle having a body, 1, mounted on a frame, 2, provided with the usual supporting wheels, 3, and axles, 4. A pair of longitudinally spaced rails, 5, are carried on the frame, co-operating with a pair of rockers, 6, on the body, so that said body may be rolled and tilted laterally for discharging its load. The frame is composed of two side members, each including a pair of longitudinally extending channel members, 7, disposed in spaced relation with their flanges extending in opposite directions. These channel members are supported in substantially the same plane as the axles and are secured together at their upper flanges by brackets hereinafter described, the lower flanges of said channels being connected by tie bars, 8. A cast draw head, 9, is mounted on the front axle, 4, having a draw bar, 10, pivotally connected thereto by a king bolt, 11. The draw bar is provided with an extension, 12, hingedly connected at, 13, for swinging about a horizontal axis to provide vertical play in the draw bar for pulling; the forward end of said extension is provided with an eye, 14, for coupling to other trailers or a draft vehicle for pulling in a train. The vehicle may have steering gear at one end only, or may be of the reversible steer type, which may be pulled in either direction, and for the latter constructions it will be understood that both ends of the vehicle are substantially the same. Of course it is to be understood that suitable locking means may be provided to lock the rear set of wheels against steering movement. However, in single steer vehicles, the rear axle may be fitted with a plate (not shown) similar to the draw head, 10, except that there will be no provision for a draw bar; or the rear axle plate may be of a similar design to that shown in my co-pending application, above mentioned, which includes a usual type of coupling for engaging the draw bar of another vehicle for pulling in a train.

It will be understood that both ends of the frame side members are suspended from the respective axles in exactly the same manner, and a description of one end of one of said side members will suffice for all. Each end of the draw head, 9, is provided with a pair of upwardly extending lugs, 17, between which is pivotally connected the forward end of a radius rod or controlling link, 18, which extends toward the opposite end of the vehicle, above, and centrally between said channel members, 7, and has its rear end loosely mounted on a rocking pin, 19, journaled in bearing brackets, 20, secured to the upper flanges of the respective channel members. The ends of the frame side members are yieldingly supported by semi-elliptic leaf springs, 21, disposed between the channels, 7, having the longer leaves of the spring on the bottom, the forward end of the spring being pivotally mounted in a bracket, 22, bolted to the underside of the axle and to the draw head, 9. The other end of the spring is pivotally connected to a swinging shackle bracket, 23, positioned intermediate said channels; the upper end of said shackle is pivotally mounted on a bolt, 24, carried in bearing brackets, 25, secured to the top flanges of each of said channels. The central or thickest portion of the leaf spring is in substantial vertical alignment with the rocking pin, 19. A saddle, 27, engages the upper surfaces of the spring leaves and is provided with a pair of upwardly projecting lugs, 28, loosely mounted on the rocking pin between the rear end of the radius rod and the bearing brackets, 20, as shown in Figure 4. A pair of U-bolts, 29, engage the ends of the saddle and pass around the spring and are secured to a plate, 30, extending across the bottom leaf of the spring.

It will now be clear that the pin, 19, serves as a rocking pivot for the spring, as it is flexed due to loads on the frame, and the swinging shackle bracket, 23, compensates for the variations in the position of the spring end during flexure. It will be noted that the frame side members are not supported directly at their ends, but at the pivot pins, 19, and 24. Of course these springs will transmit a certain amount of the pull exerted on the draw bar, throughout the side members, but the greater portion of this force is transmitted to the side members by the radius rods or controlling links, 18. The bearing brackets, 20, and 23, with their pivot pins, 19 and 24, respectively, serve as a brace and a connection of the upper flanges of the channel members, 7.

It may be understood that the rear wheels of the vehicle are fixed or locked in straight-ahead position against steering movement so that the movement of the vehicle may be controlled by the steering adjustment of the forward wheels. Each of the wheels, 3, is mounted on a spindle having a knuckle pivotally mounted on a knuckle spindle, 38, in the forked ends or yoke, 39, of the front axle 4. Each knuckle is provided with a forwardly extending steering arm, 40, the ends of which are connected together for pivotal movement by a tie rod, 41, disposed parallel to the axle in all positions of steering adjustment. A drag link, 42, is pivoted to one end of the tie rod, its other end being pivotally connected to the draw bar, 10. Ordinarily the draw bar is connected to a draft vehicle or other trailer for pulling in a train; as the pulling vehicle deviates from a straight course, the draw-bar, 10, will have a tendency to swing to one side or other about its pivot, 11, and this swinging movement is utilized to directly control the steering movement of the front wheels through the drag link, 42, and tie rod, 41, which swings the steering arms, 40, in unison to impart steering adjustment to the wheels.

I claim:

1. In a vehicle, the combination of a frame, supporting wheels and axles therefor, said frame including a side member comprising two transversely spaced longitudinally extending members, a leaf spring positioned between said members with one end connected to the axle and the other end connected to said members, and means on said members engaging the thickest portion of said spring providing a rocking pivot for said spring on said members.

2. In the combination defined in claim 1, said spring being positioned substantially within the vertical limits of said side member.

3. In the combination defined in claim 1, said means including a bracket engaging both of the longitudinally extending members, having bosses extending above said members, a pin journaled in said bosses and a saddle engaging the spring provided with an upper portion mounted on said pin, permitting rocking movement of said spring about said pin.

4. In a vehicle comprising a frame, supporting wheels and axles therefor, and a body mounted on said frame adapted to be tilted laterally for discharging its load, said frame including a pair of spaced longitudinally extending side members, and springs connected to the axles for yieldingly supporting said members in substantially the same plane as the axles, whereby the pull on the axles may be transmitted through the frame in an approximately straight line.

5. In a vehicle comprising a frame, supporting wheels and axles therefor, said frame including side members, each composed of two transversely spaced longitudinally extending members, a leaf spring disposed between each set of side members adjacent one end, with one end of said springs connected to the axle and the other end connected to said members, means engaging said springs intermediate the ends and connected to the side members for providing a rocking pivot for the springs, and a radius rod connecting said means to the axle.

6. In a vehicle comprising a frame, supporting wheels and axles therefor, said frame including side members each composed of two transversely spaced longitudinally extending beams, a leaf spring mounted between each set of beams adjacent the ends, said springs being connected at one end to the under side of the axle and the other end to the beams, saddles engaging said springs intermediate their ends, and pivotally supported on said beams for providing a rocking support for the springs, and radius rods connected to said beams and to the upper side of the axle, said springs being arranged to support the frame with the axles lying within the vertical limits of the beams, whereby to transmit the pull on the axles throughout the frame in substantially a straight line.

CHARLES G. CLEMENT.